Nov. 20, 1923. 1,474,672
C. HEUZE
APPARATUS FOR GRINDING, SMOOTHING, AND POLISHING GLASS, PLATE GLASS, AND
OTHER MATERIAL SUBSTANCES
Filed Nov. 1, 1921 2 Sheets-Sheet 1

Inventor:
Charles Heuze,
by Emil Bonnelycke.
Attorney.

Nov. 20, 1923.                                                           1,474,672
                              C. HEUZE
APPARATUS FOR GRINDING, SMOOTHING, AND POLISHING GLASS, PLATE GLASS, AND
                      OTHER MATERIAL SUBSTANCES
                          Filed Nov. 1, 1921                    2 Sheets-Sheet 2
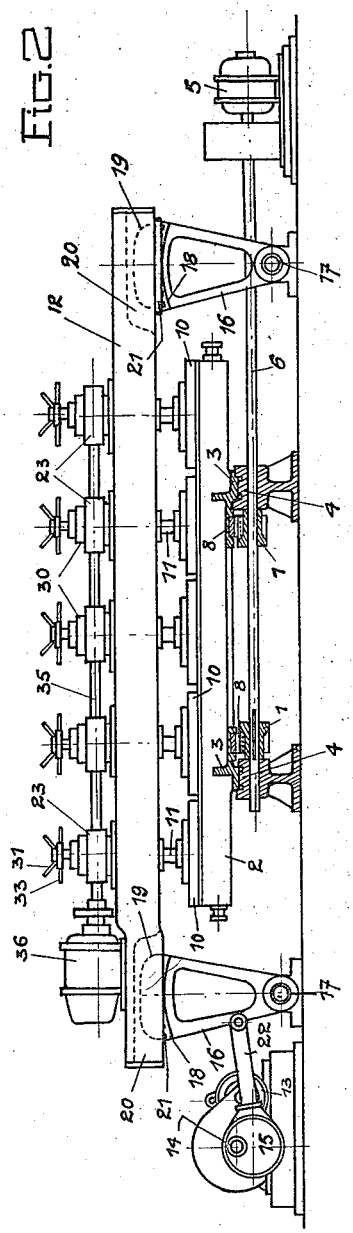
Inventor:
Charles Heuze
by Emil Bonnelycke
    Attorney.

Patented Nov. 20, 1923.

1,474,672

UNITED STATES PATENT OFFICE.

CHARLES HEUZE, OF OUVELAIS, BELGIUM.

APPARATUS FOR GRINDING, SMOOTHING, AND POLISHING GLASS, PLATE GLASS, AND OTHER MATERIAL SUBSTANCES.

Application filed November 1, 1921. Serial No. 512,138.

*To all whom it may concern:*

Be it known that I, CHARLES HEUZE, a subject of the King of Belgium, residing at Ouvelais, Belgium, have invented certain new and useful improvements in and relating to apparatus for grinding, smoothing, and polishing glass, plate glass, and other material substances, of which the following is a specification.

This invention relates to apparatus for grinding, smoothing and polishing glass and similar materials.

It has been proposed to carry out in a continuous manner, the necessary operations from rough-grinding to the final polishing. For this purpose, traveling tables have been utilized which move beneath a series of groups of tools, each group always effecting the same action. Between these groups are arranged devices for brushing and cleaning the pieces of glass so as to permit the movement of the tables to continue without interruption from one group of tools to the next.

In this known arrangement, the cross-beams supporting the tools are fixed and the tools themselves always rotate in the same direction. Such arrangement, however, offers the disadvantage of causing the tools to operate always in the same line, which is prejudicial to satisfactory working. Furthermore, the constant rotation of the tools in the same direction results in chipping the glass on the work table.

On the other hand, devices are known which permit a transverse movement of the tools, as well as devices which enable the tools to be rotated in either direction.

The present invention resides in the combination of both of these devices in such a way as to enable continuous working, so that an operating system as rational and as uniform as possible is thereby obtained.

The invention further comprises a special mechanism for imparting an alternating rectilinear movement to the cross-beams. To that end, the latter have their lower portions toothed at the extremities thereof, the teeth engaging toothed sectors formed on rockers or levers operated by eccentrics or other suitable devices.

These sectors, which constitute at the same time supports and guides for the cross-beams, insure said beams having a substantially frictionless movement and effect a perfect parallelism as between the tools and the glass undergoing treatment.

An embodiment of the invention is illustrated in the accompanying drawing, in which:

Fig. 2 is an end view of Fig. 1, but with parts in section.

Fig. 3 is a vertical detail section, on a greatly enlarged scale, showing the mounting of one of the tools and its associated devices.

Figure 1:
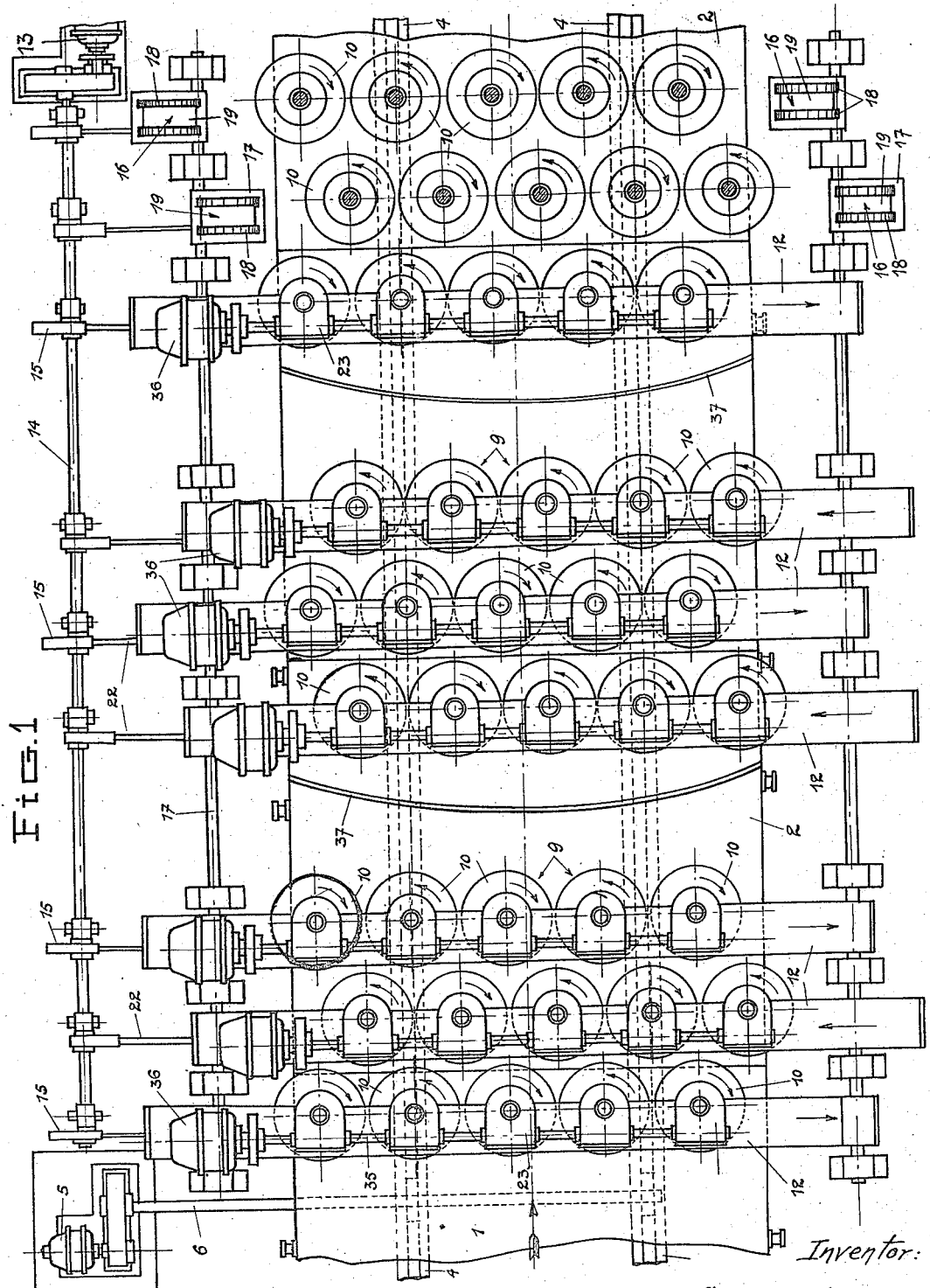
Figure 1 is a fragmental plan view of the complete apparatus.

Referring more particularly to the drawing, the apparatus, as therein shown, comprises a traveling table, a plurality of groups of operating tools arranged above the table and mechanisms for effecting the desired movements of the table and tools; together with a set of brushes or the like arranged between the groups of tools to enable the pieces of glass or other material undergoing treatment, and which are preferably in the form of glass plates or sheets, to pass from one group to the next without requiring stoppage of the table to permit the glass to be cleaned.

The table, which is generally designated by the numeral 1, preferably comprises a suitable number of similar sections or members 2, arranged in a row and coupled together in any desired manner. These sections have pairs of guide bars 3 secured to their lower faces, which are slidably engaged in, and supported by, the grooved upper or tread portions of tracks or rails 4, as represented in Fig. 2; the arrangement being such that the table will travel in an endwise direction— in this instance, from left to right, as indicated by the arrows in Fig. 1—and will be supported and guided during such travel. To effect this movement, an electric or other motor 5 may be utilized, which is connected to drive a horizontal cross-shaft 6, mounted beneath the table and provided with a pair of pinions 7 in mesh with rack bars 8 secured to the under face of the table in juxtaposed, parallel relation to the guide bars 3 (Fig. 2); it being understood that the racks, like the guide bars, are made in sections which are fastened to the individual table sections.

The working tools, as previously stated, are disposed in separate groups, of which any desired number may be employed; in the construction illustrated, three groups being shown. These groups are arranged above the table and are separated from one another to provide for the interposition of suitable brushes or the like, hereinafter referred to, between adjacent groups. The groups, in turn, each comprise a plurality of rows of tools which, for convenience, will all be designated 9, though obviously the tools will vary as to their structural details according to the particular operation or treatment which they are designed to effect; the tool proper consisting of a suitable disk 10 mounted on a vertical shaft 11 (Fig. 3).

The rows of tools are carried by crossbeams 12 which, as will be understood, extend transversely over the table in group formation, the individual beams of each group being arranged in spaced, parallel relation to one another; and these groups of beams, while they are all reciprocated simultaneously, are so connected with their operating mechanism that the alternate beams of each group move in opposite directions. Thus, assuming that there are three groups of three beams each, as in the construction illustrated, the first and third beams of the first group will move to the right, for instance, as indicated by the arrows in Fig. 1, while the second beam of that group and the first and third beams of the second group (which may be regarded as the fourth and sixth beams of the complete series) are moving to the left, and so on. The mechanism for effecting this operation may comprise a second electric or other motor 13, connected to drive a suitably mounted horizontal shaft 14 arranged parallel with, but below and to one side of the table; said shaft carrying a series of eccentrics 15, one individual to each beam and disposed in the vertical plane thereof. The beams rest directly upon, and are supported by, a series of pairs of rockers 16, one pair for each beam, these rockers being in the form of vertically-arranged sectors which are secured at their lower ends on suitably-mounted shafts 17 and the upper ends of which are each provided with two spaced sets of gear teeth 18 and with an intermediate, upstanding arcuate projection or rib 19. The ribs 19 project into guide recesses 20 formed in the lower faces of the beams at the ends thereof, and the gear teeth 18 mesh with corresponding sets of teeth or racks 21 provided at opposite sides of the recesses, so that the oscillating movements of the levers or rockers will impart a horizontal reciprocatory movement to the cross-beams, and, hence, to the tools mounted thereon. The rockers on the side of the apparatus adjacent to the shaft 14 are connected by pitmen 22 to the eccentries 15, which latter are so positioned on said shaft as to produce the requisite movements of alternate beams in opposite directions, as above explained.

Each row of tools always exerts the same action upon the glass; but it will be understood that the rows in any one group may, and probably will, exert a different action from those of some other group or groups. Thus the tools of the first group may comprise grinding disks of the same or different degrees of coarseness; those of the second group may comprise smoothing disks of the same or different fineness; and those of the third group may comprise polishing disks of similar or dissimilar character; and still other types of disks may be utilized, if preferred. In any case, however, the tools are mounted for rotary movement, and the arrangement is preferably such the tools of one row have a different direction of rotation from those of the immediately preceding and succeeding rows. The tools of the first, third, fifth, etc., rows may, therefore, be rotated in one direction, and those of the second, fourth, etc., rows may be rotated in re rotated in one direction, and those of the same row may also be rotated in opposite directions, all as indicated by the arrows.

Referring to Fig. 3, wherein one of the tools is illustrated in detail, it will be observed that the tool shaft 11, to the lower end of which the disk 10 is fastened, extends vertically through the beam 12 and through a case 23 rigidly mounted on the upper face of the beam, and terminates at its upper end in a head or collar 24. The case 23 contains a helicoidal gear wheel 25; and the shaft 11 passes loosely through said case and beam, but has a key-connection 26 with gear 25 so that it may move endwise relatively to said gear, the latter itself being held against bodily movement. The collar 24 fits loosely in a seat 27 provided in the headed lower end 28 of a screw 29 which extends through a threaded opening in the top of a chamber or box 30 formed on the upper wall of the case, so that the tool shaft may thus be regarded as suspended from screw 29. Said screw is provided at its upper end with a finger-piece or handle 31, rotation of which, in one direction or the other will, therefore, raise or lower the tool bodily and, hence, adjust the pressure of its disk 10 upon the glass; a lock nut 32, through which the screw passes, provided with a finger-piece or handle 33 and adapted to be tightened against the top of box 30, being utilized to retain the parts in adjusted position.

The helicoidal gear 25 meshes with and is driven by a worm 34 secured to a horizontal cross-shaft 35, of which there is one individual to each beam 12 and, hence, to each row of tools. Each shaft extends through all of the cases 23 included in the row of tools with which it is associated and is driven from an electric motor 36 mounted on the end of the cross-beam; any suitable means being provided for supporting the shaft. The worms 34 may have right or left-hand threads, according as the corresponding worm wheel 25 and tool 9 are to be rotated in one direction or the other; and it is to be understood that the precise direction of rotation of the tools of any row relative to each other and to the tools of adjacent rows is not an essential feature of the invention but may be varied at will, though the preferred arrangement is that indicated by the arrows in Fig. 1, as previously stated. It will also be apparent that any beam 12 may easily be lifted bodily out of the apparatus, because of its being supported solely by the rockers 16 whereon it rests, and replaced by another beam having tools of a different character or different direction of rotation.

It is further to be observed that an appreciable space is left between each two groups of rows of tools, which space is to be utilized for the reception of suitable cleaning devices. The latter are indicated more or less diagrammatically at 37, and may consist of arcuate brushes which are adapted to engage the glass and sweep away the dust and fine particles of glass produced by the grinding or other treatment; such cleaning action thus taking place during the time that the glass is passing from one group of rows of tools to the next group. Consequently, the necessity for periodically stopping the apparatus to effect cleaning is entirely avoided. If desired, suitable means or mechanism may be provided for lifting the plates or sheets of glass, which are completely polished on one side when they pass beyond the last row of tools in the last group, from the table sections and either turning them over or removing them from the table. In the former instance, the table sections may be immediately returned to their starting point, and in the latter instance they may be reloaded and then returned. The devices for effecting these operations form, in themselves, no part of the invention, and for that reason have not been illustrated.

Various other modifications and changes may also be made within the scope of the invention as hereinafter claimed.

I claim as my invention:—

1. Apparatus of the character described, comprising a table for supporting the work; a succession of rows of tools extending above and across the table, each row having an individual support; mechanism for imparting an endwise reciprocating bodily movement to all of said supports simultaneously, but moving the odd-numbered supports in one direction and the even-numbered supports in the opposite direction; and mechanism for rotating all of the tools of a row simultaneously.

2. Apparatus of the character described, comprising a table for supporting the work; a succession of rows of tools extending above and across the table, each row having an individual support; mechanism for imparting an endwise reciprocating bodily movement to all of said supports simultaneously, but moving the odd-numbered supports in one direction and the even-numbered supports in the opposite direction; and mechanism carried by and individual to each support for rotating all of the tools in the corresponding row simultaneously.

3. Apparatus of the character described, comprising a table for supporting the work; a succession of rows of tools extending above and across the table, each row having an individual support; mechanism for imparting an endwise reciprocating movement to all of said supports simultaneously, but moving successive supports alternately in opposite directions; and mechanism for rotating all of the tools of a row simultaneously, but some of the tools in a different direction from others.

4. Apparatus of the character described, comprising a table for supporting the work; a succession of rows of tools extending above and across the table, each row having an individual support; mechanism for imparting an endwise reciprocating movement to all of said supports simultaneously, but moving successive supports alternately in opposite directions; and mechanism carried by and individual to each support for rotating all of the tools in the corresponding rows simultaneously, but some of the tools in a different direction from others.

5. Apparatus of the character described, comprising a table for supporting the work; a driving shaft extending parallel with said table; a succession of cross-beams arranged above the table; an individual connection between said shaft and the adjacent end of each beam for reciprocating all of the beams simultaneously, certain of said connections being timed to produce movements of the corresponding beams in different directions from other beams; a row of tools carried by each beam; and operating means for the tools.

6. Apparatus according to claim 5, in which the tool-operating means comprise a motor individual to each beam and mounted thereon, a shaft connected to each motor, and connections between said shaft and all of the tools carried by the beam.

7. Apparatus of the character described, comprising a work-supporting table; a beam extending above and across the table; a row of tools carried by the beam; means for imparting an endwise reciprocatory movement to the beam; a motor mounted on the beam to move therewith; a shaft connected to be driven by the motor; and driving connections between said shaft and each of the tools.

8. Apparatus of the character described, comprising a work-supporting table; a beam extending above and across the table and having the end portions of its lower surface toothed; a pair of toothed rockers supporting and engaged with the toothed ends of the beam; driving means connected with one rocker to operate the same and thereby reciprocate the beam endwise; a row of tools carried by the beam; and means for rotating the tools.

9. Apparatus according to claim 8, in which each of the toothed, end portions of the beam comprises two spaced sets of teeth, with an intermediate, longitudinal guide recess; and in which each rocker has two spaced sets of teeth for mesh with the first-named sets, and an intermediate projection for reception in the guide recess, substantially as described.

10. Apparatus of the character described, comprising a work-supporting table; a succession of rows of tools extending above and across the table; a support individual to each row; mechanism connected to reciprocate bodily all of said supports endwise simultaneously, but certain of said supports in the opposite direction to others; means for rotating the tools; and means for imparting a progressive forward movement to the table.

11. Apparatus of the character described, comprising a work-supporting table; a plurality of rows of tools extending above and across the table; a support individual to each row; mechanism connected to reciprocate said supports endwise; and means for rotating all of the tools of a row simultaneously, but some of the tools in a different direction from others.

12. Apparatus of the character described, comprising a work-supporting table; a plurality of rows of tools arranged in successive groups, each group embodying tools of a different character from other groups; an individual support for each row of tools extending above and across the table; mechanism for reciprocating bodily all of the supports of all of the groups simultaneously, but certain supports of each group in the opposite direction from others of that group; and means for rotating the tools.

13. Apparatus of the character described, comprising a work-supporting table; a plurality of groups of tools, each group consisting of at least one row of tools extending above and across the table; a support individual to each row; mechanism connected to reciprocate bodily all of the supports in all of the groups simultaneously but certain supports in different directions from others; and mechanism for rotating the tools.

14. Apparatus of the character described, comprising a work-supporting table; a plurality of groups of tools, each group consisting of at least one row of tools extending above and across the table; a support individual to each row; mechanism connected to reciprocate all of the supports in all of the groups simultaneously but certain supports in different directions from others; and mechanism for rotating a plurality of rows of tools simultaneously, but some of the tools in the opposite direction from others.

15. Apparatus of the character described, comprising a work-supporting table; a plurality of groups of tools, each group consisting of at least one row of tools extending above and across the table; a support individual to each row; mechanism connected to reciprocate all of the supports in all of the groups simultaneously but certain supports in different directions from others; mechanism for rotating a plurality of rows of tools simultaneously, but some of the tools in the opposite direction from others; and means for imparting a progressive forward movement to the table, to carry the work from one group of tools to the next.

In testimony whereof I affix my signature.

CHARLES HEUZE.

Witnesses:
 LEONARD LEVA,
 FIRMIN HAVEN.